United States Patent [19]

Chang

[11] 4,208,465

[45] Jun. 17, 1980

[54] CLEAR COAT/COLOR COAT FINISH CONTAINING AN ANTIOXIDANT AND AN ULTRAVIOLET LIGHT STABILIZER

[75] Inventor: David C. Chang, Birmingham, Mich.

[73] Assignee: E. I. Du Pont de Nemours and Company, Wilmington, Del.

[21] Appl. No.: 902,416

[22] Filed: May 3, 1978

[51] Int. Cl.[2] .......................... B32B 15/08; B44D 1/14

[52] U.S. Cl. ............................ 428/416; 260/33.6 UA; 260/42.43; 260/42.44; 260/42.52; 260/45.95 F; 427/409; 427/410; 428/418; 428/458; 428/463

[58] Field of Search .................... 427/409, 410, 385 R, 427/385 D, 386, 388 R, 388 D; 260/33.6 UA, 42.52, 42.43, 42.44, 45.95 F; 428/463, 416, 418, 458

[56] References Cited

U.S. PATENT DOCUMENTS

| | | | |
|---|---|---|---|
| 2,919,259 | 12/1959 | Naylor et al. | 260/45.95 F |
| 3,134,752 | 5/1964 | Costello et al. | 260/45.95 F |
| 3,407,156 | 10/1968 | La Berge | 260/33.6 X |
| 3,499,781 | 3/1970 | Krueckel | 427/407 X |
| 3,639,147 | 2/1972 | Benefiel et al. | 427/409 X |
| 3,660,537 | 5/1972 | Fryd et al. | 260/33.6 X |
| 3,823,205 | 7/1974 | Zimmt | 260/33.6 X |
| 3,984,500 | 10/1976 | Dickie et al. | 427/409 X |

*Primary Examiner*—Michael R. Lusignan

[57] ABSTRACT

A substrate that has a finish of a clear coat toplayer in firm adherence to a color coat layer that is in adherence with the substrate; wherein the clear coat consists essentially of a transparent film forming binder;

the color coat consists essentially of a film forming binder and pigments;

both the clear coat and the color coat contain an antioxidant and an ultraviolet light stabilizer;

This finish has an excellent appearance and has excellent weatherability and durability and is particularly useful as a finish for automobiles and trucks.

50 Claims, No Drawings

CLEAR COAT/COLOR COAT FINISH CONTAINING AN ANTIOXIDANT AND AN ULTRAVIOLET LIGHT STABILIZER

BACKGROUND OF THE INVENTION

This invention is directed towards coated substrates and in particular toward coated metal substrates that form the exterior of automobiles and trucks.

Acrylic enamel, acrylic lacquer and alkyd enamel finishes are widely used on the exterior of automobiles and trucks. It has been found that an excellent appearance along with depth of color and metallic glamour can be obtained by applying a clear or transparent coat over the conventional colored or pigmented coat. However, the weatherability and durability of these clear coats have been found to be poor since checking, cracking and flaking of the clear coat occurs after relatively short periods of exposure to outdoor weathering which gives the automobile or truck an unsightly appearance. Refinishing of these weathered clear coats is difficult and expensive since the clear coat must be sanded to remove cracked and flaked clear coat before a refinish coat can be applied.

In an effort to retard or substantially reduce checking, cracking and flaking of the clear coat, conventional ultraviolet light stabilizers with and without antioxidants have been added to the clear coat. Also, a combination of a transparent pigment and an ultraviolet light screener have been added to the clear coat as suggested by LaBerge U.S. Pat. No. 3,407,156 issued Oct. 22, 1968. In each of the above cases, the durability and weatherability of the clear coat was increased only a relatively small length of time but not to the extent required for a practical automotive or truck finish.

There is need for a clear coat/color coat finish for metal substrates that will withstand long periods of weathering without failure of the finish. This invention provides a clear coat/color coat finish that has excellent weatherability and durability as required for automobiles and trucks.

SUMMARY OF THE INVENTION

A substrate having a finish of a clear coat toplayer in firm adherence to a color coat that is in adherence with the substrate; wherein the clear coat consists essentially of a transparent film forming binder;

the color coat consists essentially of a film forming binder and pigments in a weight ratio of about 1/100 to 150/000, and the color coat and clear coat each contain about 1–20% by weight, based on the weight of the binder of the coat, of an ultraviolet light stabilizer and about 0.1–5% by weight, based on the weight of the binder of the coat, of an antioxidant; wherein the weight ratio of ultraviolet light stabilizer to antioxidant is about 1:1 to about 50:1.

DETAILED DESCRIPTION OF THE INVENTION

A clear coat/color coat finish for substrates has been developed in which both the clear coat and the color coat contain an ultraviolet (U.V.) light stabilizer and an antioxidant. While applicant does not wish to be held to the following theory, it is believed that U.V. stabilizer and antioxidant migrate from the color coat into the clear coat and U.V. stabilizer and antioxidant are replenished as these are lost from the clear coat due to weathering. The color coat provides a reservoir for the U.V. stabilizer and antioxidant for the clear coat and maintains the stabilizer and antioxidant at an effective level that provides protection from weathering.

The thickness of the fully cured color coat and clear coat can vary. Generally, the color coat is about 0.6–1.0 mils thick and the clear coat is about 0.8–1.5 mils thick.

The color coat contains pigment in a pigment to binder weight ratio of about 1/100 to about 150/100. Any of the conventional pigments used in coating compositions including metallic flake pigments can be used.

The clear coat can also contain transparent pigments, i.e., pigments having the same or similar refractive index as the binder of the clear coat and are of a small particle size of about 0.015–50 microns. Typical pigments that can be used in a pigment to binder weight ratio of about 1/100 to 10/100 are inorganic siliceous pigments, such as silica pigments. These pigments have a refractive index of about 1.4–1.6.

The coatings are usually applied to all types of substrates such as primed or unprimed metal, plastic, rubber, fiberglass reinforced with polyester resins and the like by conventional spraying techniques and preferably the clear coat is applied to the color coat while the color coat is still wet. Other conventional application techniques can be used such as brushing, roller coating and the like. Under some circumstances it may be desirable to apply both the color coat and clear coat in the form of a powder and upon baking coalesce the powders into a clear coat/color coat finish. Also, it may be desirable to apply the clear coat as a powder to a wet color coat and then to form a finish by baking.

Generally, the finish is baked at about 50°–180° C. for about 5 to 40 minutes to form a fully cured finish. If conventional ambient temperature drying finishes are used, elevated baking conditions are not required.

About 1–20% by weight, based on the weight of the binder, of an ultraviolet light stabilizer is used both in the clear coat and in the color coat. Generally, about 5–8% by weight of the ultraviolet light stabilizer is used.

About 0.1–5% by weight, based on the weight of the binder, of an antioxidant is used in the clear coat and in the color coat. Generally, about 0.1–1% by weight of the antioxidant is used.

The weight ratio of ultraviolet light stabilizer is maintained at about 1:1 to about 50:1. Preferably, to form a high quality durable finish, a ratio of about 10:1 is maintained.

Typical ultraviolet light stabilizers that are useful in this invention are as follows:

Benzophenones such as dodecyl oxibenzophenone, 2,4-dihydroxybenzophenone, hydroxybenzophenones containing sulfonic groups, 2,4 dihydroxy-3′,5′-ditertiary butyl benzophenone, 2,2′,4′, trihydroxy benzophenone esters of dicarboxylic acids, 2-hydroxy-4-acryloxyethoxybenzophenone, aliphatic mono esters of 2,2′,4-trihydroxy-4′alkoxybenzophenone; 2-hydroxy-4-methoxy-2′-carboxybenzophenone;

Triazoles such as 2-phenyl-4-(2′,4′-dihydroxybenzoyl)-triazoles, substituted benzotriazoles such as hydroxy-phenyltriazoles such as 2-(2′-hydroxy-5′-methyl phenyl) benzotriazole, 2-(2′-hydroxy-phenyl) benzotriazole, 2-(2′-hydroxy-5′-octylphenyl) naphthotriazole.

Triazines such as 3,5-dialkyl-4-hydroxyphenyl derivatives of triazine, sulfur containing derivatives of diallyl-4-hydroxy phenyl triazines, hydroxy phenyl-1,3,5-triazine and such triazines containing sulfonic acid groups, aryl 1,3,5 trazines, orthohydroxyl aryl-s-triazone;

Benzoates such as dibenzoate of diphenylol propane, tertiary butyl benzoate of diphenylol propane, nonyl phenyl benzoate, octyl phenyl benzoate, resorcinol dibenzoate;

Other ultraviolet light stabilizers include lower alkyl thiomethylene containing phenols, substituted benzenes such as 1,3-bis-(2'-hydroxybenzoyl) benzene, metal derivatives of 3,5-di-t-butyl-4-hydroxy phenyl proprionic acid, asymmetrical oxalic acid diarylamides, alkylhydroxyphenyl- thioalkanoic acid esters, dialkylhydroxyphenyl alkanoic acid esters of di and tri pentaerythritol, phenyl and naphthalene substituted oxalic acid diamides, methyl beta-(3,5-di-tert-butyl-4-hydroxyphenyl)-proprionate, $\alpha,\alpha'$-bis-(2-hydroxyphenol)-di-isopropyl-benzenes, 3,5'-dibromo-2'hydroxy acetophenone, ester derivatives of 4,4-bis(4'hydroxyphenyl)pentanoic acid wherein there is at least one unsubstituted position ortho to the aromatic hydroxyl groups, organophosphorus sulfides such as bis(diphenyl phosphinothioyl) monosulfide and bis(diphenyl phosphinothioyl)disulfide, 4-benzoyl-6-(dialkyl-hydroxy-benzyl)resorcinal, bis(3-hydroxy-4-benzoyl-phenoxy)diphenyl silane, bis (3-hydroxy-4-benzoylphenoxy) dialkyl silane, 1,8-naphthalimides,$\alpha$cyano,$\beta$,$\beta$-diphenylacrylic acid derivatives, bis(2-benzoxazolyl) alkanes, bis(2-naphthoxazolyl)alkanes, methylene malonitriles containing aryl and heterocyclic substitutes, alkylene-bis-dithio-carbanate, 4-benzoyl-3-hydroxy phenoxyethyl acrylate, 4-benzoyl-3-hydroxyphenoxy ethyl methacrylate, aryl or alkyl substituted acrylonitriles, 3-methyl-5-isopropylphenyl-6-hydroxy coumarone.

Typical antioxidants are as follows: tetrakis alkylene(-di-alkyl hydroxy aryl)alkyl ester alkanes such as tetrakis methylene 3(3',5'-dibutyl-4'hydroxyphenyl)proprionate methane, reaction product of p-amino diphenylamine and glycidyl methacrylate, reaction product of n-hexyl-N'-phenyl-p-phenylene diamine and glycidyl methacrylate, pentaerythritol tetrakis(thioglycolate), trimethylol propane tris(thioglycolate), trimethylol ethane tris (thioglycoate), N-(4-anilino phenyl) acrylamide, N-(4-anilinophenyl) maleamic acid N-(4-anilinophenyl) maleimide, alkylhydroxyphenyl groups bonded through carboalkoxy linkages to nitrogen atom of a heterocyclic nucleus containing an imidodicarbonyl group or an inidodithiocarbonyl group, 3,5 di tert. butyl-4-hydroxy cinnamonitrile, ethyl 3,5-di tert, hexyl-4-hydroxycinnamate, substituted benzyl esters of $\beta$-(substituted hydroxy phenyl) propionic acids, bis-(hydroxyphenyl alkylene) alkyl isocyanurate compounds, tetrakis hydroxy benzyl phosphonium halides alone or in combination with a dialkylthiodialkanoate, thiodimethylidyne tetrakisphenols alone or in combination with a dialkyl thiodialkanoate or phosphite or phosphonate, dihydrocarbyl-hydroxy phenyl aryl or alkyl phosphonites or phosphonates or phosphates or phosphites or phosphinates or phosphinites or phisphorothionates or phosphinothionates, diphenyl bis(3,5-ditert-butyl-4-hydroxyphenoxy) silane, hydrocarbyl-hydroxyphenyl-dihydrocarbyldithiocarbamates such as 3,5 di-tert-butyl-4-hydroxy phenyl dimethyldithio carbamate and amino benzyl thioether.

One preferred combination of ultraviolet light stabilizer and antioxidant is dodecyl oxibenzophenone or a substituted 2(2'-hydroxyphenyl) benzotriazole and tetrakis methylene 3(3',5',-dibutyl-4-'-hydroxyphenyl) proprionate.

The film forming binder used in the clear coat/color coat can be from those conventional coating compositions used to finish automobiles and trucks such as solvent or water based acrylic lacquers, acrylic dispersion lacquers, solvent or water based thermosetting acrylic enamels, polyester enamels, nonaqueous acrylic dispersion enamels, alkyd resin enamels, polyurethane enamels and the like. It is possible to have the binder of the clear coat different from the binder of the color coat. For example, a thermosetting acrylic enamel clear coat can be used with a polyester enamel color coat.

Typical acrylic lacquers that can be used are disclosed in Crissey and Lowell U.S. Pat. Nos. 2,934,509 and 2,934,510 both issued on Apr. 26, 1960, Godshalk U.S. Pat. No. 2,860,110 issued Nov. 11, 1958 and Zimmt U.S. Pat. No. 3,823,205 issued July 9, 1974. The teachings of the Zimmt patent are hereby incorporated by reference.

One preferred acrylic lacquer is a solution in which the film forming component is at least one of (1) poly(methyl methacrylate),
(2) poly(ethyl methacrylate),
(3) poly(propyl methacrylate),
(4) poly(isopropyl methacrylate),
(5) a copolymer composed only of methylmethacrylate and at least one of an alkyl acrylate whose alkyl group contains 1 through 20 carbon atoms, an alkyl methacrylate whose alkyl group contains 2 through 18 carbon atoms, or styrene,
(6) mixtures of these, and at least one of (1) a copolymer composed only of methyl methacrylate and an alkyl acrylate whose alkyl group contains 1 through 10 carbon atoms or an alkyl methacrylate whose alkyl group contains 4 through 18 carbon atoms, or
(2) mixtures of said copolymers; and contains an inert organic solvent for the above polymers.

One particular preferred acrylic lacquer the film forming component is poly(methyl methacrylate) and is at least one of (1) a methyl methacrylate/methyl acrylate copolymer whose monomer unit weight ratio is 70/30 to 40/60 respectively,
(2) a methyl methacrylate/ethyl acrylate copolymer whose monomer unit weight ratio is 80/20 to 40/60 respectively,
(3) a methyl methacrylate/butyl acrylate copolymer whose monomer unit weight ratio is 85-15 to 65/35 respectively,
(4) a methyl methacrylate/2-ethylhexyl acrylate copolymer whose monomer unit weight ratio is 90/10 to 70/30 respectively,
(5) a methyl methacrylate/octyl methacrylate copolymer whose monomer unit weight ratio is 85/15 to 65/35 respectively, or
(6) a methyl methacrylate/lauryl methacrylate copolymer whose monomer unit weight ratio is 90/10 to 75/25 respectively, The acrylic lacquer can contain an alkyd resin and a cellulose acetate butyrate resin.

Typical acrylic dispersion lacquers that can be used are disclosed in Fryd and Lee U.S. Pat. No. 3,660,537 issued May 2, 1972. One particularly useful acrylic dispersion lacquer has the film forming component a graft copolymer having a backbone which is a copolymer of polymerized (a) monomers of about 85–99.6%, by weight, of an ester of acrylic acid or methacrylic acid;

(b) monomers which provide potential grafting sites of about 0.2–15%, by weight, of allyl methacrylate; and (c) about 0.2–9.5% by weight of diethylaminoethyl methacrylate, tert-butylaminoethyl methacrylate, aminoethylvinyl ether or dimethylaminoethyl methacrylate;

the total of the monomers which provide potential grafting sites do not exceed 15% by weight of the total backbone, and a polymeric graft segment comprised of polymerized monomers of 2-ethyl hexyl acrylate, butyacrylate, 2-ethyl hexyl methacrylate or lauryl methacrylate the graft segment comprising about 5–80% by weight of the total graft copolymer.

One particularly useful graft copolymer used in these dispersion lacquers comprises methyl methacrylate/diethylaminoethyl methacrylate/ allyl methacrylate/ 2-ethylhexyl acrylate in a weight ratio of about 84.0/0.8/0.51/14.2.

An aqueous dispersion lacquer composition of a binder in an aqueous medium can also be used; the binder is comprised of (1) a dispersed polymer of methyl methacrylate that can contain small amounts of adhesion promoting monomers such as diethylaminoethylmethacrylate and (2) a dispersant polymer of methyl methacrylate, an alkyl acrylate or an alkyl methacrylate having 2–12 carbon atoms in the alkyl groups, and an ethylenically unsaturated carboxylic acid such as acrylic acid or methacrylic acid; and the composition contains sufficient base such as amine or ammonium hydroxide to provide a pH of about 7–11 and usually contains conventional plasticizers, pigments and other additives as are used in aqueous coating compositions.

A wide variety of solvent based thermosetting acrylic enamels of an acrylic polymer and a crosslinker such as an alkylated melamine formaldehyde can be used such as those described in Parker U.S. Pat. No. 3,674,734 issued July 4, 1972, Parker U.S. Pat. No. 3,637,546 issued Jan. 25, 1972 and Irvin et al. U.S. Pat. No. 3,901,840 issued Aug. 26, 1975.

Of particular use are the acrylic enamels containing cellulose acetate buryrate described in the aforementioned Parker U.S. Pat. No. 3,637,546 which is hereby incorporated by reference. These enamels comprise about 10–60% by weight of a film-forming polymer blend and a solvent for said polymer blend wherein said polymer blend consists essentially of (1) 50–80% by weight, based on the weight of the polymer blend, of an acrylic polymer which consists essentially of (a) 0–25% by weight styrene, (b) 25–55% by weight methyl methacrylate (c) 38–48% by weight of a soft constituent of an alkyl acrylate or an alkyl methacrylate wherein the alkyl groups have 2–12 carbon atoms;

(d) 5–20% by weight of a hydroxy containing constituent of a hydroxy alkyl methacrylate or a hydroxy alkyl acrylate wherein the alkyl groups contain 2–4 carbon atoms; and (e) 1–5% by weight of an $\alpha,\beta$-unsaturated monocarboxylic acid;

wherein said acrylic polymer has a relative viscosity of 1.04–1.10 measured at 25° C. in ethylene dichloride according to ASTM D-445-46T, Method B;

(2) 5–50% by weight, based on the weight of the polymer blend, of cellulose acetate butyrate having butyryl content of about 45–55% by weight and a viscosity at 25° C. of about 1–6 seconds measured according to ASTM-D-1343-56;

(3) 5–50% by weight, based on the weight of the polymer, of a melamine formaldehyde resin which has been at least partially reacted with an aliphatic monohydric alcohol having from 1–4 carbon atoms.

Particularly useful in these enamels are acrylic polymers of 10–18% by weight styrene, 25–30% by weight methyl methacrylate, 38–42% by weight butyl acrylate, 10–16% by weight hydroxyethyl acrylate and 1–3% by weight acrylic acid and acrylic polymers of 40–50% by weight methyl methacrylate, 40–48% by weight butyl acrylate, 6–10% by weight hydroxyethyl acrylate, 3–5% by weight acrylic acid Aqueous thermosetting acrylic enamels can also be used. These enamels contain the following film-forming constituents:

(1) an acrylic polymer of styrene and/or methyl methacrylate, an alkyl acrylate or an alkyl methacrylate other than methyl methacrylate, a hydroxy alkyl acrylate or a hydroxy alkyl methacrylate and an $\alpha,\beta$-unsaturated carboxylic acid wherein the polymer has an acid number of 35–150 and a carboxyl/hydroxyl ratio of 1:0.2 to 1:3, and (2) a water soluble or water dispersible alkylated melamine formaldehyde resin. Typically useful enamels of this type are disclosed in British Pat. No. 1,414,436 granted Feb. 25, 1976.

Preferred are aqueous enamels in which the acrylic polymer is of 50–60% by weight of methyl methacrylate, 30–40% by weight of butyl acrylate, 5–10% by weight of hydroxy ethyl acrylate and 4–12% by weight of acrylic acid and the polymer has an acid number of about 35–100 and a carboxyl to hydroxyl ratio of 1:0.3 to 1:1.5.

Another preferred aqueous enamel in which the acrylic polymer is of 28–32% by weight of styrene, 22–26% by weight of methyl methacrylate, 30–35% by weight of butyl acrylate, 7–9% by weight of hydroxy ethyl acrylate, 4–6% by weight of acrylic acid, and has an acid number of 30–50, and a carboxyl to hydroxyl ratio of 1:0.4 to 1:1.5.

In one particularly preferred aqueous enamel the acrylic polymer consists essentially of 54% methyl methacrylate, 34% butyl acrylate, 6% 2-hydroxyethyl acrylate and 6% acrylic acid and has an acid number of about 45–50 and a carboxyl to hydroxyl ratio of about 1:0.6.

Polyester enamels can also be used. The polyesters are the reaction products of a polyol and a dicarboxylic acid or anhydride and are crosslinked with a conventional crosslinking agent such as alkylated melamine formaldehyde, a benzoguanamine formaldehyde, urea formaldehyde and the like.

One useful polyester enamel has a binder of a polymer blend of about

35–70% by weight, based on the weight of the polymer blend, of a polyester of an alkylene glycol, a triol an aromatic dicarboxylic acid and an aliphatic dicarboxylic acid;

15–30% by weight, based on the weight of the polymer blend, of cellulose acetate butyrate and 15–35% by weight, based on the weight of the polymer blend, of an alkylate melamine formaldehyde resin.

A polyester enamel may be used as a clear coat but preferably an acrylic enamel or lacquer as described above is used as this clear coat with a polyester enamel.

A nonaqueous thermosetting acrylic disperion enamel can be used. These enamels are obtained by polymerizing a hydroxy alkyl acrylate or methacrylate in a dispersing liquid in the presence of a dispersion stabilizer and a carboxylic acid and an amine. An aminoplast resin is added to the polymer dispersion after an active solvent is added to form a solution of the acrylic polymer. One useful dispersion stabilizer is formed by a. graft copolymerizing
   1. the reaction product of glycidyl methacrylate and poly(12-hydroxystearic acid),
   2. methyl methacrylate, and
   3. glycidyl methacrylate to form a copolymer product containing pendant epoxy groups; and
b. reacting said pendant epoxy groups with methacrylic acid.

Typically useful nonaqueous thermosetting acrylic dispersion enamels and process for making the same are disclosed in Sullivan et al U.S. Pat. No. 3,996,667 issued June 29, 1976 which is hereby incorporated by reference.

Typical acrylic polyurethane coating composition that can be used are disclosed in Vasta U.S. Pat. No. 3,558,564 issued Jan. 26, 1971.

Conventional plasticizers, pigments and other additives as are used in coating compositions can be incorporated into the color coat or clear coat as required. The compositions can be reduced with conventional solvents, if solvent based compositions, for application such as spraying. If the compositions are aqueous based, then water or water solvent mixtures can be used.

Two particularly useful additives for both the color coat and the clear coat are iron pyrophosphate and finely divided silica. Up to about 10% by weight and generally about 0.1–10% by weight based on the weight of the binder, of iron pyrophosphate can be used. Up to about 15% by weight, and generally about 0.5–15% by weight, based on the weight of the binder, of finely divided silica can be used. Iron pyrophosphate and the silica improved overall durability and performance of the finish of this invention.

Conventional baking temperatures are used to dry and cure the coatings after application such as 50° C.–200° C. for about 10–60 minutes. The resulting finish should be baked sufficiently to provide full cure and maximum film properties.

The following examples illustrate the invention. All parts and percentages are on a weight bases unless otherwise specified.

EXAMPLE 1

The following constituents are blended together to form a paint A (control):

| | Parts by Weight |
|---|---|
| Portion 1 | |
| Acetone | 9.30 |
| Alkyd resin solution (85% solids alkyd resin of ethylene glycol/phthalic anhydride/coconut oil having a hydroxyl No. of about 20 and an acid No. of about 8–10 in toluene and having a Gardner Holdt viscosity of about Z measured at 25° C.) | 9.53 |
| Portion 2 | |
| Aluminum Flake Mill Base (29.8% polymethyl methacrylate, 12.4% aluminum flake and 57.8% solvent mixture of toluene and acetone) | 15.48 |
| Blue Mill Base (10% monastral blue flake, 16% polymethyl methacrylate, 74% solvent mixture of toluene and acetone) | 3.39 |
| Carbon Black Mill Base (6% carbon black pigment, 24% polymethyl methacrylate, 70% solvent mixture of toluene, acetone, ethylene glycol monoether acetate, butyl acetate) | 0.33 |
| Green Mill Base (8.33% monastral green pigment, 21.11% polymethylmethacrylate, 70.66 solvent mixture of toluene/acetone/xylene) | 0.36 |
| Portion 3 | |
| Silicone solution (4% silicone SF69 in xylene) | 0.03 |
| PMMA Solution (40% solids of polymethyl methacrylate ratio of 70/30) | 2.70 |
| PMMA/DEAM Solution (40% solids of a copolymer of 99% methyl methacrylate and 1% diethylaminoethyl methacrylate in acetone/toluene, 27/73 ratio) | 4.04 |
| PMMA/BA Solution (40% solids of a copolymer of 85% methyl methacrylate and 15% butyl acrylate in acetone/toluene, 17/83 ratio) | 20.02 |
| PBA Solution (50% solids polybutylacrylate in xylene) | 0.20 |
| CAB Solution (25% solids cellulose acetate butyrate having a 37% butyryl content 2 second viscosity in toluene/acetone, 70/30 ratio) | 12.98 |
| CAB Solution II (15% solids cellulose acetate butyrate having a 38% butyryl content and a 20 second viscosity in toluene/acetone, 70/30 ratio) | 21.64 |
| Total | 100.00 |

Portion 1 is charged into a mixing vessel and mixed for 10 minutes, portion 2 is added and mixed for 10 minutes and then portion 3 is added and mixed for 20 minutes to form Paint A. Paint A has a weight solids content of 32.41% and a binder content of 30.8% by weight.

Paint B is prepared as follows:

| | |
|---|---|
| Paint A (prepared above) | 50.000 |
| U.V. Stabilizer (dodecyl oxibenzophenone) | 0.880 |
| Antioxidant[tetrakis methylene 3(3',5'-dibutyl-4'-hydroxyphenyl)proprionate methane] | 0.088 |

-continued

| | | |
|---|---|---|
| | Total | 50.986 |

The above constituents are mixed together for 15 minutes to form paint B.

A clear coating A (control) is prepared by blending together the following constituents:

| | Parts by Weight |
|---|---|
| Toluene | 2.92 |
| Acetone | 11.60 |
| Ethylene glycol monobutyl ether acetate | 4.72 |
| Alkyd resin solution (90% solids in toluene of an alkyd resin of adipic acid, neopentyl glycol/ benzoic acid having a Gardner Holdt Viscosity measured at 25° C. at the above solids of U-W) | 5.60 |
| Silicone Solution (described above) | 0.03 |
| PMMA Solution (described above) | 14.81 |
| PMMA/DEAM Solution (described above) | 8.22 |
| PMMA/BA Solution (40% Solids of a copolymer of 82% methy methacrylate and 18% butyl acrylate in acetone/ toluene, 17/83 ratio) | 33.45 |
| PBA Solution (described above) | 0.20 |
| CAB Solution (25% solids of cellulose acetate butyrate having a 37% butyryl content and a 2 second viscosity in acetone/ethylene glycol mono-butylether acetate, ratio 94/6) | 18.45 |
| Total | 100.00 |

The above constituents are blended together to form a clear coating composition having a binder solids content of 32.35%.

A clear coating B is prepared as follows:

| | Parts by Weight |
|---|---|
| Clear coating A (prepared above) | 50.000 |
| U.V. Stabilizer (desribed above) | 0.410 |
| Antioxidant (described above) | 0.041 |
| Total | 50.451 |

Paint A (control) and Paint B are reduced to a spray viscosity of 47.5 seconds measured at 25° C. with a No. 1 Fisher Cup with a paint thinner of acetone/-toluene/xylene ratio of 22.5/43.5/34. The reduced paints are each sprayed onto separate phosphatized steel panels and allowed to air dry for 10 minutes.

Clear coat A (control) and Clear coat B are similarly reduced to a spray viscosity and Clear coat A (control) is sprayed onto the paint A (control) coated panel and clear coat B is sprayed onto the paint B coated panel. Each is allowed to air dry 10 minutes and then baked for 10 minutes at 82° C. and 30 minutes at 155° C. The clear coat on each of the panels is about 1.3 mils thick and the paint is about 1.0 mils thick.

Each of the panels are then exposed to a Q.U.V. "Weather-O-Meter" that uses a SF40 Westinghouse ultraviolet lamp and has the following cycles: 8 hours ultraviolet exposure at 68° C. and 4 hours at 100% relative humidity at 55° C.

The gloss of each of the panels is measured at 20° C. after given exposure times and checking of the clear coat is noted. The results are as follows:

Exposure Data

| | Time Exposure (hrs.) | Gloss Measured at 20° 0 | 100 | 200 | 340 |
|---|---|---|---|---|---|
| Clear Coat A/ Color Coat A (control) | | 75 | 73 | 70 | 52* |
| Clear Coat B/ Color Coat B | | 83 | 81 | 81 | 78 |
| | Time Exposure (hrs.) | Gloss measured at 20° 400 | 600 | 730 | 800 |
| Clear Coat A/ Color Coat A (Control) | | 46 | FAILED | | |
| Clear Coat B/ Color Coat B | | 78 | 71 | 69* | 66 |

*Checked

The results show that the control checked after 340 hours and failed after 600 hours while clear coat B/color coat B which contains an antioxidant and U.V. stabilizer checked at 730 hours exposure. From these data, it can be expected that clear coat/color coat systems of acrylic solution lacquer that contain an antioxidant and a U.V. stabilizer will have an outdoor durability of about twice that of the same lacquer that does not contain an antioxidant and a U.V. stabilizer.

EXAMPLE 2

An acrylic dispersion lacquer is prepared according to the teachings of Example 1 U.S. Pat. No. 3,660,537 issued May 2, 1972. A paint C (control) is prepared using the same mill bases as used in Example 1 above and paint D is prepared which is identical to Paint C except the same U.V. stabilizer and antioxidant are added as in Example 1 for paint B in the same amounts.

A clear coating C (control) is prepared from the acrylic dispersion lacquer and a clear coat D is prepared which is identical to coating C except the same U.V. stabilizer and antioxidant are added as in Example 1 for clear coating B in the same amounts.

Paints C (control) and D are reduced to a spray viscosity and each is sprayed onto separate phosphatized steel panels and allowed to air dry for 10 minutes.

Clear coats C (control) and D are reduced to a spray viscosity. Clear coat C (control) is sprayed onto paint C (control) coated panel. Clear coat D is sprayed onto paint D coated panel. Each panel is dried and baked as in Example 1. The clear coat on each of the panels is about 1.3 mils thick and the paint on each of the panels is about 1.0 mils thick.

The panels are then exposed to a "Weather-O-Meter" as in Example 1. The gloss of each of the panels is measured at 20° after given exposure times and checking of the clear coat is noted. The results are as follows:

Exposure Data

| | Time Exposure (hrs.) | Gloss Measured at 20° 0 | 150 | 280 | 400 |
|---|---|---|---|---|---|
| Clear Coat C/ Color Coat C/ (control) | | 74 | 62 | 51* | 40 |

-continued

| | Time Exposure (hrs.) | Gloss Measured at 20° | | | |
|---|---|---|---|---|---|
| Clear Coat D/ Color Coat D | | 77 | 75 | 68 | 60 |
| | Time Exposure (hrs.) | 550 | 750 | 900 | 1000 |
| Clear Coat C/ Color Coat C (control) | | 15 | FAILED | | |
| Clear Coat D/ Color Coat D | | 56 | 53* | 48 | 35 |

*Checked

The results show that the control checked after 280 hours and failed after 550 hours while clear coat D/color coat D which contain an antioxidant and a U.V. stabilizer checked at 750 hours exposure. From these data, it can be expected that clear coat/color coat systems of acrylic dispersion lacquer that contain an antioxidant and a U.V. stabilizer will have an outdoor durability of more than twice that of the same lacquer that does not contain an antioxidant and a U.V. stabilizer.

EXAMPLE 3

A polyester solution is prepared in which the polyester is the reaction product of an alkylene glycol, a triol, an aromatic dicarboxylic acid and an aliphatic dicarboxylic acid and contains cellulose acetate butyrate and an alkylated melamine formaldehyde crosslinking agent. A paint E (control) is prepared therefrom using the same pigmentation as used in Example 1 and paint F is prepared which is identical to paint E except a U.V. stabilizer of a substituted 2(2,-hydroxyphenyl) benzotriazole and an antioxidant described in Example 1 are added in the same amounts as in Example 1 for paint B.

A clear coating (control) E is prepared from an acrylic solution lacquer (described in Example 1) and a clear coat F is prepared which is identical to coating E except the above U.V. stabilizer and antioxidant are added in the same amounts as in Example 1 for clear coating B.

Paints E (control) and F are reduced to a spray viscosity. Clear coat E (control) is sprayed onto paint E (control) coated panel. Clear coat F is sprayed onto paint F coated panel. Each panel is dried and baked as in Example 1. The clear coat on each of the panels is about 1.5 mils thick and the paint on each of the panels is about 0.7 mils thick.

The panels are then exposed to a "Weather-O-Meter" as in Example 1. The gloss of each of the panels is measured at 20° after given exposure times and checking of the clear coat is noted. The results are as follows:

Exposure Data

| | Time Exposure (hrs.) | Gloss Measured at 20° | | | | |
|---|---|---|---|---|---|---|
| | | 0 | 450 | 600 | 800 | |
| Clear Coat E/ Color Coat E (control) | | 75 | 62 | 59 | 45 | |
| Clear Coat F/ Color Coat F | | 95 | 90 | 91 | 90 | |
| | | 950 | 1900 | 2200 | 2500 | 3000 |
| Clear Coat F/ Color Coat E (control) | | 13* | FAILED | | | |
| Clear Coat F/ Color Coat F | | 90 | 89 | 87* | 65 | 26 |

*Checked

The results show that the control checked after 950 hours and failed after 950 hours while clear coat F/color coat F which contain an antioxidant and a U.V. stabilizer checked at 2200 hours exposure. From these data, it can be expected that clear coat/color coat systems of clear acrylic solution lacquer/polyester color coat that contain an antioxidant and a U.V. stabilizer will have an outdoor durability of more than twice that of the same system that does not contain an antioxidant and a U.V. stabilizer.

EXAMPLE 4

An aqueous acrylic dispersion is prepared according to the teachings of Example 1 British Pat. No. 1,414,436 granted Feb. 25, 1976. A paint G (control) is prepared using a light blue metallic mill base and paint H is prepared which is identical to paint G except a U.V. stabilizer of 2-hydroxy-4-methoxy-2-carboxybenzophenone and an antioxidant described in Example 1 are added in the same amounts as in Example 1 for paint B.

A clear coating G (control) is prepared from the aqueous acrylic dispersion and a clear coat H is prepared which is identical to coating G except the above U.V. stabilizer and antioxidant are added in the same amounts as in Example 1 for clear coating B.

Paints G (control) and H are reduced to a spray viscosity and each is sprayed onto separate phosphatized steel panels and allowed to air dry for 10 minutes.

Clear coats G (control) and H are reduced to a spray viscosity. Clear coat G (control) is sprayed onto paint G (control) coated panel. Clear coat H is sprayed onto a paint H coated panel. Each panel is dried and baked as in Example 1. The clear coat on each of the panels is about 1.2 mils thick and the paint on each of the panels is about 0.8 mils thick.

The panels are then exposed to a "Weather-O-Meter" as in Example 1. The gloss of each of the panels is measured at 20° after given exposure times and checking of the clear coat is noted. The results are as follows:

Exposure Data

| | Time Exposure (hrs.) | Gloss Measured at 20° | | | | |
|---|---|---|---|---|---|---|
| | | 0 | 400 | 800 | 1200 | |
| Clear Coat G/ Color Coat G (control) | | 90 | 81 | 67 | 39 | |
| Clear Coat H/ Color Coat H | | 80 | 81 | 77 | 73 | |
| | | 1400 | 1800 | 2200 | 2600 | 2800 |
| Clear Coat G/ Color Coat G (control) | | 21 | FAILED | | | |
| Clear Coat H/ Color Coat H | | 71 | 68 | 58 (distorted) | 28 | 16 |

The results show that the control failed after 1400 hours while clear coat H/color coat H which contains an antioxidant and a U.V. stabilizer distorted 2200 hours exposure. From these data, it can be expected that clear coat/color coat system of an aqueous acrylic dispersion enamel that contains an antioxidant and a U.V. stabilizer will have an outdoor durability substantially better than that of the same enamel that does not contain an antioxidant and a U.V. stabilizer.

EXAMPLE 5

An acrylic enamel containing cellulose acetate butyrate is prepared according to the teachings of U.S. Pat. No. 3,637,546 issued June 25, 1972. A paint I (control) is prepared using the same mill bases as used in Example 1 and paint J is prepared which is identical to paint I except a U.V. stabilizer of a substituted 2(2,-hydroxyphenyl)benzotriazole and an antioxidant identified in Example 1 are added in the same amounts as in Example 1 for paint B.

A clear coating I (control) is prepared from the above acrylic enamel containing cellulose acetate butyrate and a clear coat J is prepared which is identical to coating I except the same U.V. stabiilizer and antioxidant are added as above in the same amounts as in Example 1 for clear coating B.

About 0.3% by weight based on the weight of the binder, of iron pyrophosphate is included in each of the above paints and clear coats.

Paints I (control) and J are reduced to a spray viscosity and each is sprayed onto separate phosphatized steel panels and allowed to air dry for 10 minutes.

Clear coats I (control) and J are reduced to a spray viscosity. Clear coat I (control) is sprayed onto paint I (control) coated panel. Clear coat J is sprayed onto paint J coated panel. Each panel is dried and baked as in Example 1. The clear coat on each of the panels is about 1.0 mil thick and the paint on each of the panels is about 1.0 mil thick.

The panels are then exposed to a "Weather-O-Meter" as in Example 1. The gloss of each of the panels is measured at 20° after given exposure times and checking of the clear coat is noted. The results are as follows:

Exposure Data

| Time Exposure (hrs.) | Gloss Measured at 20° 0 | 500 | 1000 | 1500 |
|---|---|---|---|---|
| Clear Coat I/ Color Coat I (control) | 82 | 74 | 68 | 62 (blistered) |
| Clear Coat J/ Color Coat J | 88 | 88 | 85 | 85 |

| Time Exposure (hrs.) | Gloss Measured at 20° 2100 | 3000 | 4000 | 4800 |
|---|---|---|---|---|
| Clear Coat I/ Color Coat I (control) | 40 | FAILED | | |
| Clear Coat J/ Color Coat J | 84 | 82 | 70 | 68 |

| Time Exposure (hrs.) | Gloss Measured at 20° 5000 | 5250 |
|---|---|---|
| Clear Coat I/ Color Coat I (control) | FAILED | |
| Clear Coat J/ Color Coat J | 66 | 63 (checked) |

The results show that the control failed after 2100 hours while clear coat J/color coat J which contain an antioxidant and a U.V. stabilizer checked after 5250 hours exposure. From these data, it can be expected that clear coat/color coat system of an acrylic enamel that contains an antioxidant and a U.V. stabilizer will have a substantially longer period of outdoor durability than that of the same acrylic enamel that does not contain an antioxidant and a U.V. stabilizer.

EXAMPLE 6

An acrylic nonaqueous dispersion enamel is prepared according to the teachings of U.S. Pat. No. 3,966,667 issued June 29, 1976. A paint K (control) is prepared using the same mill bases as used in Example 1 and paint L is prepared which is identical to paint K except a U.V. stabilizer of a substituted 2(2,hydroxyphenol) benzotriazole and antioxidant described in Example 1 are added in the same amounts as in Example 1 for paint B.

A clear coating K (control) is prepared from the non aqueous dispersion enamel and a clear coat L is prepared which is identical to coating K except the above U.V. stabilizer, and antioxidant are added in the same amounts as in Example 1 for clear Coating B. To clear coat L 3.2% by weight, based on the weight of the binder, of finely divided silica and 2% by weight based on the weight of the binder, of iron pyrophosphate are added.

Paints K (control) and L are reduced to a spray viscosity and each is sprayed onto separate phosphatized steel panels and allowed to air dry for 10 minutes.

Clear coats K (control) and L are reduced to a spray viscosity. Clear coat K (control) is sprayed onto paint K (control) coated panel. Clear coat L is sprayed onto paint L coated panel. Each panel is dried and baked as in Example 1. The clear coat on each of the panels is about 1.0 mil thick and the paint on each of the panels is about 1.0 mil thick.

The panels are then exposed to a "Weather-O-Meter" as in Example 1. The gloss of each of the panels is measured at 20° after given exposure times and checking of the clear coat is noted. The results are as follows:

Exposure Data

| Time Exposure (hrs.) | Gloss Measured at 20° 0 | 500 | 1000 | 1500 |
|---|---|---|---|---|
| Clear Coat K/ Color Coat K (control) | 85 | 86 | 82 | 85 |
| Clear Coat L/ Color Coat L | 85 | 58 | 42 | 15 |

| Time Exposure (hrs.) | Gloss Measured at 20° 2000 | 2200 | 2500 | 3000 |
|---|---|---|---|---|
| Clear Coat K/ Color Coat K (control) | 85 | 82** | 82 | 79 |
| Clear Coat L Color Coat L | 12 | 83* | 23 | 93* |

**Checked
*Polished with standard automotive polish to restore gloss

The results show that the control checked after 2200 hours, while clear coat L/color coat L which contains an antioxidant and a U.V. stabilizer did not check even after 3000 hours exposure. Clear coat L/color coat L lost gloss at a more rapid rate than the control but the gloss was restored by polishing. From these data, it can be expected that clear coat/color coat system of a nonaqueous acrylic dispersion enamel that contains an antioxidant and a U.V. stabilizer and additives above will have an outdoor durability greater than that of the same enamel that does not contain an antioxidant and a stabilizer.

I claim:

1. A substrate having a finish of a clear coat top layer in firm adherence to a color coat layer in adherence with said substrate; wherein the clear coat consists essentially of a transparent film forming binder comprising an acrylic polymer;

the color coat consists essentially of a film forming binder and pigments in a pigment to binder weight ratio of about 1/100 to 150/100; and the color coat and clear coat each contain about 1-20% by weight, based on the weight of the binder, of an ultraviolet light stabilizer and about 0.1-5% by weight, based on the weight of the binder, of an antioxidant; wherein the weight ratio of ultraviolet light stabilizer to antioxidant is about 1:1 to about 50:1 and wherein the ultraviolet light stabilizer and antioxidant migrate from the color coat to the clear coat as ultraviolet light stabilizer and antioxidant are lost from exposure to weathering of the finish thereby providing an adequate level of ultraviolet light stabilizer and antioxidant to retard deterioration from weathering of the finish.

2. The substrate of claim 1 in which the color coat is about 0.6-1.0 mils thick and the clear coat is about 0.8-1.5 mils thick.

3. The substrate of claim 2 in which the substrate is a metal. Pg,31

4. The metal substrate of claim 3 in which the ultraviolet light stabilizer is a benzophenone or a substituted benzotriazole type stabilizer.

5. The metal substrate of claim 4 in which the antioxidant is an alkylene (dialkyl hydroxy aryl) ester alkane.

6. The metal substrate of claim 5 in which the binder of the clear coat and the color coat is an acrylic polymer or a mixture of acrylic polymers.

7. The metal substrate of claim 6 in which the binder of the clear coat and the color coat consists essentially of (A) at least one of
 (1) poly(methyl methacrylate),
 (2) poly(ethyl methacrylate),
 (3) poly(propyl methacrylate),
 (4) poly(isopropyl methacrylate),
 (5) a copolymer composed only of methyl methacrylate and at least one of an alkyl acrylate whose alkyl group contains 1 through 20 carbon atoms, an alkyl methacrylate whose alkyl group contains 2 through 18 carbon atoms, or styrene,
 (6) mixtures of these, and
(B) at least one of
 (1) a copolymer composed only of methyl methacrylate and an alkyl acrylate whose alkyl group contains 1 through 10 carbon atoms or an alkyl methacrylate whose alkyl group contains 4 through 18 carbon atoms, or
 (2) mixtures of said copolymers.

8. The metal substrate of claim 7 in which the binder of the clear coat and the color coat consists essentially of (A) poly(methyl methacrylate) and
(B) at least one of
 (1) a methyl methacrylate/methyl acrylate copolymer whose monomer unit weight ratio is 70/30 to 40/60 respectively,
 (2) a methyl methacrylate/ethyl acrylate copolymer whose monomer unit weight ratio is 80/20 to 40/60 respectively,
 (3) a methyl methacrylate/butyl acrylate copolymer whose monomer unit weight ratio is 85/15 to 65/35 respectively,
 (4) a methyl methacrylate/2-ethylhexyl acrylate copolymer whose monomer unit weight ratio is 90/10 to 70/30 respectively,
 (5) a methyl methacrylate/octyl methacrylate copolymer whose monomer unit weight ratio is 85/15 to 65/35 respectively, or
 (6) a methyl methacrylate/lauryl methacrylate copolymer whose monomer unit weight ratio is 90/10 to 75/25 respectively.

9. The metal substrate of claim 8 in which the binder contains in addition to the acrylic polymer an alkyd resin and cellulose acetate butyrate.

10. The metal substrate of claim 9 in which the ultraviolet light stabilizer is dodecyl oxibenzophenone and the antioxidant is tetrakis methylene 3(3',5'-dibutyl-4'-hydroxyphenol) proprionate methane.

11. The metal substrate of claim 6 in which the acrylic polymer is a graft copolymer consisting essentially of a backbone copolymer of polymerized (a) monomers of about 85-99.6%, by weight based on the weight of the backbone, of an alkyl ester of acrylic acid or methacrylic acid;
(b) monomers which provide potential grafting sites of about 0.2-15%, by weight based on the weight of the backbone, of allyl methacrylate; and
(c) about 0.2-5% by weight, based on the weight of the backbone, of diethylaminoethyl methacrylate, tert-butylamino ethyl methacrylate, aminoethylvinyl ether or dimethylaminoethyl methacrylate;

the total of the monomers which provide potential grafting sites do not exceed 15% by weight of the total backbone, and a polymeric graft segment comprised of polymerized monomers of 2-ethyl hexyl acrylate, butyacrylate, 2-ethyl hexyl methacrylate or lauryl methacrylate, the graft segment comprising about 5-80% by weight of the total graft copolymer.

12. The metal substrate of claim 11 in which the acrylic polymer consists essentially of a backbone of polymerized monomers of methyl methacrylate, diethylaminoethyl methacrylate, allyl methacrylate and a graft segment of polymerized monomers of 2-ethylhexylacrylate or butyl acrylate.

13. The metal substrate of claim 12 in which the ultraviolet light stabilizer is dodecyl oxibenzophenone and the antioxidant is tetrakis methylene 3(3',5'-dibutyl-4'hydroxyphenyl) proprionate methane.

14. The metal substrate of claim 6 in which the binder of the clear coat and the color coat consists essentially of a polymer blend of (1) a polymer of methyl methacrylate and
(2) a polymer of methyl methacrylate, an alkyl acrylate or an alkyl methacrylate having 2-12 carbon atoms in alkyl groups and an ethylenically unsaturated carboxylic acid.

15. The metal substrate of claim 5 in which the binder of the clear coat and the color coat is an acrylic polymer crosslinked with an alkylate melamine formaldehyde resin.

16. The metal substrate of claim 5 in which the binder of the clear coat and the color coat is an acrylic polymer containing cellulose acetate butyrate and crosslinked with an alkylated melamine formaldehyde resin.

17. The metal substrate of claim 16 in which the binder of the clear coat and the color coat consists essentially of (1) 50–80% by weight, based on the binder of an acrylic polymer which consists essentially of
(a) 0–25% by weight styrene,
(b) 25–55% by weight methyl methacrylate,
(c) 38–48% by weight of a soft constituent selected from the group consisting of an alkyl acrylate and an alkyl methacrylate wherein the alkyl groups contain 2–12 carbon atoms;
(d) 5–20% by weight of hydroxy containing constituent selected from the group consisting of a hydroxy alkyl methacrylate and a hydroxy alkyl acrylate wherein the alkyl groups contain 2–4 carbon atoms; and
(e) 1–5% by weight of an $\alpha,\beta$-unsaturated monocarboxylic acid;
wherein said acrylic polymer has a relative viscosity of 1.04–1.10 measured at 25° C. in ethylene dichloride according to ASTM D-445-46T, Method B;
(2) 5–50% by weight, based on the weight of the binder of cellulose acetate butyrate having butyryl content of about 45–55% by weight and a viscosity at 25 C. of about 1–6 seconds measured according to ASTM-D-1343-56;
(3) 5–50% by weight based on the weight of the binder of a melamine formaldehyde resin which has been at least partially reacted with an aliphatic monohydric alcohol having from 1–4 carbon atoms.

18. The metal substrate of claim 17 in which the acrylic polymer consists essentially of 10–18% by weight styrene, 25–30% by weight methyl methacrylate, 38–42% by weight butyl acrylate, 10–16% by weight hydroxyethyl acrylate and 1–3% by weight acrylic acid.

19. The metal substrate of claim 17 in which the acrylic polymer consists essentially of 40–50% by weight methyl methacrylate, 40–48% by weight butyl acrylate, 6–10% by weight hydroxyethyl acrylate, 3–5% by weight acrylic acid.

20. The metal substrate of claim 17 in which the ultraviolet light stabilizer is a 2(2,-hydroxy phenyl) benzotriazole and the antioxidant is tetrakis methylene 3(3',5'-dibutyl-4'-hydroxy phenyl)-proprionate methane.

21. The metal substrate of claim 5 containing up to 10% by weight, based on the weight of the binder, of iron pyrophosphate.

22. The metal substrate of claim 5 containing up to 15% by weight, based on the weight of the binder of finely divided silica.

23. The metal substrate of claim 5 containing about 0.1–10% by weight, based on the weight of the binder of iron pyrophosphate and about 0.5–15% by weight, based on the weight of the binder, of finely divided silica.

24. The metal substrate of claim 5 in which the binder of the color coat and the clear coat consists essentially of (1) an acrylic polymer of methyl methacrylate, an alkyl acrylate or an alkyl methacrylate other than methyl methacrylate, a hydroxy alkyl acrylate or a hydroxy alkyl methacrylate and an a,B-unsaturated carboxylic acid wherein the polymer has an acid number of 35–150 and a carboxyl/hydroxy ratio of 1:0.2 to 1:3; and
(2) crosslinked with alkylated melamine formaldehyde resin.

25. The metal substrate of claim 24 in which the acrylic polymer consists essentially of 50–60% by weight of methyl methacrylate, 30–40% by weight of butyl acrylate, 5–10% by weight of hydroxy ethyl acrylate and 4–12% by weight of acrylic acid and the polymer has an acid number of about 35–100 and a carboxyl to hydroxyl ratio of 1:0.3 to 1:1.5.

26. The metal substrate of claim 24 in which the acrylic polymer consists essentially of 28–32% by weight of styrene, 22–26% by weight of metyl methacrylate, 30–35% by weight of butyl acrylate, 7–9% by weight of hydroxy ethyl acrylate, 4–6% by weight of acrylic acid, and has an acid number of 30–50, and a carboxyl to hydroxyl ratio of 1:0.4 to 1:1.5.

27. The metal substrate of claim 24 in which the acrylic polymer consists essentially of 54% methyl methacrylate, 34% butyl acrylate, 6% 2-hydroxyethyl acrylate and 6% acrylic acid and has an acid number of about 45–50 and a carboxyl to hydroxyl ratio of about 1:0.6.

28. The metal substrate of claim 24 in which the ultraviolet light stabilizer is 2-hydroxy-4-methoxy-2'-carboxy benzophenone.

29. The metal substrate of claim 5 in which the binder of the color coat consists essentially of a polymer formed by polymerizing a hydroxy alkyl acrylate or methacrylate in the presence of a dispersion stabilizer.

30. The metal substrate of claim 29 in which the dispersion stabilizer is formed by a. polymerizing
1. the reaction product of glycidyl methacrylate and poly(12-hydroxystearic acid),
2. methyl methacrylate, and
3. glycidyl methacrylate to form a copolymer product containing pendant epoxy groups; and
b. reacting said pendant epoxy groups with methacrylic acid.

31. The metal substrate of claim 30 in which the ultraviolet light stabilizer is a substituted 2(2-hydroxy phenol) benzotriazole and the antioxidant is tetrakis methylene 3(3',5',-dibutyl-4'-hydroxyphenyl) proprionate methane.

32. The metal substrate of claim 5 in which the binder of the color coat is a blend of a polyester of a polyol and a dicarboxylic acid and a crosslinking agent and the binder of the clear coat is an acrylic polymer.

33. The metal substrate of claim 32 in which the binder of the color coat is a blend consisting essentially of 35–70% by weight, based on the weight of the blend, of a polyester of alkylene glycol/a triol/aromatic dicarboxylic acid/aliphatic dicarboxylic acid;
15–30% by weight, based on the weight of the polymer blend, of cellulose acetate butyrate and
15–35% by weight, based on the weight of the polymer blend, of an alkylated melamine formaldehyde resin and the binder of the clear coat is an acrylic resin.

34. The metal substrate of claim 33 in which the ultraviolet light stabilizer is a substituted 2(2,hydroxyphenol) benzotriazole.

35. A process for finishing a substrate which comprises:

(1) applying a color coat layer to the substrate wherein the color coat consists essentially of a liquid carrier and a film forming binder and pigments in a pigment to binder ratio of about 1/100 to about 150/100; and (2) applying a clear coat layer directly to the color coat layer wherein the clear coat consists essentially of a liquid carrier and a film forming binder comprising an acrylic polymer; and wherein both the color coat and the clear coat each contain about 1–20% by weight, based on the weight of the binder, of an ultraviolet light stabilizer and about 0.1–5% by weight, based on the weight of the binder, of an antioxidant; and wherein the weight ratio of ultraviolet light stabilizer to antioxidant is about 1:1 to about 50:1;

(3) drying the above applied layers to form a finish on the substrate.

36. The process of claim 35 in which the resulting color coat is about 0.6–1.0 mils thick and the clear coat is about 0.8–1.5 mils thick.

37. The process of claim 35 in which the ultraviolet light stabilizer is a benzophenone or a substituted benzotriazole type stabilizer and the antioxidant is an alkylene (dialkyl hydroxy aryl) ester alkane.

38. The process of claim 37 in which the color coat and clear are an acrylic lacquer in which the binder consists essentially of (A) at least one of
(1) poly(methyl methacrylate),
(2) poly(ethyl methacrylate),
(3) poly(propyl methacrylate),
(4) poly(isopropyl methacrylate),
(5) a copolymer composed only of methyl methacrylate and at least one of an alkyl acrylate whose alkyl group contains 1 through 20 carbon atoms, an alkyl methacrylate whose alkyl group contains 2 through 18 carbon atoms, or styrene,
(6) mixtures of these, and (B) at least one of
(1) a copolymer composed only of methyl methacrylate and an alkyl acrylate whose alkyl group contains 1 through 10 carbon atoms or an alkyl methacrylate whose alkyl group contains 4 through 18 carbon atoms, or
(2) mixtures of said copolymers; and containing an inert organic solvent for (A) and (B).

39. The process of claim 37 in which the color coat and the clear coat are solvent based acrylic dispersion lacquers in which the binder consists essentially of a graft copolymer having (A) a backbone which is a copolymer comprised of polymerized
(a) monomers of about 85–99.6% by weight, of an alkyl ester of acrylic acid or methacrylic acid;
(b) monomers which provide potential grafting sites of about 0.2–15% by weight, of allyl methacrylate; and monomers of about
(c) 0.2–5% by weight of diethylaminoethyl methacrylate, tertbutylaminoethyl methacrylate, aminoethylvinyl ether or dimethylaminoethyl methacrylate;

the total of the monomers which provide potential grafting sites not exceeding 15% by weight of the total backbone, and (B) a polymeric graft segment comprised of polymerized monomers of 2-ethyl hexyl acrylate, butylacrylate, 2-ethylhexyl methacrylate or lauryl methacrylate, the graft segment comprising from 5–80% by weight of the total graft copolymer.

40. The process of claim 39 in which the graft copolymer has a backbone which is a copolymer comprised of polymerized monomers of methyl methacrylate allyl methacrylate and diethylaminoethyl methacrylate, and graft segments which are a copolymer comprised of polymerized monomers of 2-ethyl hexyl acrylate or butyl acrylate.

41. The process of claim 37 in which the color coat and the clear coat are aqueous acrylic dispersions in which the binder consists essentially of (1) a dispersed polymer A of methyl methacrylate and small amounts of an adhesion promoting monomer and (2) a dispersant polymer B of methyl methacrylate, an alkyl acrylate or an alkyl methacrylate and an ethylenically unsaturated carboxylic acid; and the lacquer contains sufficient base to provide a pH of about 7–11.

42. The process of claim 37 in which the color coat and clear coat are aqueous acrylic dispersion in which the binder consists essentially of (1) an acrylic polymer of methyl methacrylate, an alkyl acrylate or an alkyl methacrylate other than methyl methacrylate, a hydroxy alkyl acrylate or a hydroxy alkyl methacrylate and an $\alpha,\beta$-unsaturated carboxylic acid wherein the polymer has an acid number of 35–150 and a carboxyl/hydroxyl ratio of 1:0.2 to 1:3; and (2) a water soluble or water dispersible alkylated melamine formaldehyde resin and contains sufficient base to provide a pH of about 7–11.

43. The process of claim 37 in which the color coat and the clear coat are a thermosetting nonaqueous dispersion of a polymer formed by polymerizing a hydroxy alkyl acrylate or methacrylate in a liquid in the presence of a dispersion stabilizer.

44. The process of claim 43 in which the dispersion stabilizer is formed by a. polymerizing
1. the reaction product of glycidyl methacrylate and poly(12-hydroxystearic acid),
2. methyl methacrylate, and
3. glycidyl methacrylate to form a copolymer product containing pendant epoxy groups; and b. reacting said pendant epoxy groups with methacrylic acid.

45. The process of claim 37 in which the color coat and clear coat are a thermosetting acrylic enamel comprising 10–60% by weight of a film-forming binder and a solvent for said binder wherein said binder consists essentially of (1) 50–80% by weight, based on the weight of the binder, of an acrylic polymer which consists essentially of
(a) 0–25% by weight styrene,
(b) 25–55% by weight methyl methacrylate,
(c) 38–48% by weight of a soft constituent selected from the group consisting of an alkyl acrylate and an alkyl methacrylate wherein the alkyl groups contain 2–12 carbon atoms;
(d) 5–20% by weight of a hydroxy containing constituent selected from the group consisting of a hydroxy alkyl methacrylate and a hydroxy alkyl acrylate wherein the alkyl group contain 2–4 carbon atoms; and (e) 1–5% by weight of an α,β-unsaturated monocarboxylic acid;

wherein said acrylic polymer has a relative viscosity of 1.04–1.10 measured at 25° C. in ethylene dichloride according to ASTM D-445-46T, Method B;

(2) 5–50% by weight, based on the weight of the binder of cellulose acetate butyrate having butyryl content of about 45–55% by weight and a viscosity at 25° C. of about 1–6 seconds measured according to ASTM-D-1343-56;

(3) 5–50% by weight based on the weight of the binder, of a melamine formaldehyde resin which has been at least partially reacted with an aliphatic monohydric alcohol having from 1–4 carbon atoms.

46. The process of claim 37 in which the enamel contains about 0.1–10% by weight, based on the weight of the binder of iron pryophosphate and 0.5–15% by weight, based on the weight of the binder, of finely divided silica.

47. The process of claim 37 in which the color coat is a composition of comprising about 10–50% by weight, of a blend of a polyester of a polyol and a dicarboxylic acid and a crosslinking agent and the clear coat is an acrylic lacquer.

48. The substrate of claim 2 in which the substrate is a flexible plastic.

49. The substrate of claim 2 in which the substrate is a flexible rubber.

50. The substrate of claim 2 in which the substrate is a primed ferrous metal.

* * * * *